(12) United States Patent
Gladel et al.

(10) Patent No.: US 10,408,138 B2
(45) Date of Patent: Sep. 10, 2019

(54) METHOD AND FUNCTIONAL MONITORING APPARATUS FOR FUNCTIONAL MONITORING OF AN APPARATUS FOR VARIABLE SETTING OF A CYLINDER COMPRESSION IN A RECIPROCATING-PISTON INTERNAL COMBUSTION ENGINE

(71) Applicant: Robert Bosch GmbH, Stuttgart (DE)

(72) Inventors: Pascal Gladel, Ludwigsburg (DE); Bernd Kesch, Hemmingen (DE); Holger Jessen, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 359 days.

(21) Appl. No.: 15/287,955

(22) Filed: Oct. 7, 2016

(65) Prior Publication Data
US 2017/0102291 A1 Apr. 13, 2017

Related U.S. Application Data

(60) Provisional application No. 62/240,356, filed on Oct. 12, 2015.

(30) Foreign Application Priority Data

Jan. 12, 2016 (DE) .......................... 10 2016 200 190

(51) Int. Cl.
*G01M 15/08* (2006.01)
*F02D 15/00* (2006.01)
(Continued)

(52) U.S. Cl.
CPC ............. *F02D 15/02* (2013.01); *F02D 15/00* (2013.01); *F02D 35/0015* (2013.01); *F02D 41/1454* (2013.01); *F02D 41/1497* (2013.01); *F02D 41/221* (2013.01); *F02D 41/26* (2013.01); *G01M 15/08* (2013.01);
(Continued)

(58) Field of Classification Search
CPC .... F02D 15/02; F02D 41/221; F02D 41/1497; F02D 35/0015; F02D 41/1454; F02D 15/00; F02D 41/26; F02D 41/062; F02D 41/042; F02D 41/009; F02D 2200/0802; F02D 2200/101; G01M 15/08; G01M 99/008; Y02T 10/40
See application file for complete search history.

(56) References Cited

U.S. PATENT DOCUMENTS

2014/0026861 A1 * 1/2014 Bechtold ............... F02B 75/045
123/48 R

FOREIGN PATENT DOCUMENTS

DE 19703948 C1 6/1998
DE 19955250 A1 5/2001

* cited by examiner

*Primary Examiner* — Anne M Antonucci
(74) *Attorney, Agent, or Firm* — Norton Rose Fulbright US LLP; Gerard Messina (57) ABSTRACT

A method for functional monitoring of an apparatus for variable setting of a cylinder compression in a reciprocating-piston internal combustion engine is described, including ascertaining a value of an engine parameter which is indicative of an engine position of the internal combustion engine at a defined cylinder compression; comparing the ascertained value with a further value of the engine parameter; and determining, depending on a result of the comparison, whether the apparatus for variable setting of the cylinder compression is functioning correctly.

8 Claims, 4 Drawing Sheets

(51) Int. Cl.
  *F02D 15/02* (2006.01)
  *F02D 35/00* (2006.01)
  *F02D 41/14* (2006.01)
  *F02D 41/26* (2006.01)
  *F02D 41/22* (2006.01)
  *G01M 99/00* (2011.01)
  *F02D 41/00* (2006.01)
  *F02D 41/04* (2006.01)
  *F02D 41/06* (2006.01)

(52) U.S. Cl.
  CPC .......... *F02D 41/009* (2013.01); *F02D 41/042* (2013.01); *F02D 41/062* (2013.01); *F02D 2200/0802* (2013.01); *F02D 2200/101* (2013.01); *G01M 99/008* (2013.01); *Y02T 10/40* (2013.01)

METHOD AND FUNCTIONAL MONITORING APPARATUS FOR FUNCTIONAL MONITORING OF AN APPARATUS FOR VARIABLE SETTING OF A CYLINDER COMPRESSION IN A RECIPROCATING-PISTON INTERNAL COMBUSTION ENGINE

CROSS REFERENCE

The present application claims the benefit under 35 U.S.C. § 119 of U.S. application Ser. No. 62/240,356 filed on Oct. 12, 2015, and German Patent Application No. DE 102016200190.6 filed on Jan. 11, 2016, each of which is expressly incorporated herein by reference in its entirety.

FIELD

The present invention relates to a method and a functional monitoring apparatus for functional monitoring of an apparatus for variable setting of a cylinder compression in a reciprocating-piston internal combustion engine, to a computer program, and to an electronic storage medium.

BACKGROUND INFORMATION

As permitted CO2 exhaust gas emission values in the automotive sector become more stringent, it is desirable to develop new technologies for improving overall efficiency of a reciprocating-piston internal combustion engine. Such technology relates, for example, to variable setting of a cylinder compression of gas in cylinders of the internal combustion engine, in order to achieve optimal operation of the internal combustion engine without knock susceptibility and with individually settable cylinder compression for different engine operating points. Variable cylinder compression also influences the fuel consumption of the internal combustion engine and the exhaust gas emissions of the internal combustion engine. Prerequisites for this are that an internal combustion engine with variable cylinder compression be diagnosis-relevant in accordance with current onboard diagnosis legislation, and that implementation of the setting of cylinder compression for the internal combustion engine must be monitored during engine operation for correct functionality. DE 199 55 250 A1 discloses such functional monitoring of variable cylinder compression in a reciprocating-piston internal combustion engine, which evaluates rough running, combustion chamber pressure, intake duct pressure, or engine torque of the internal combustion engine for functional monitoring.

It is desirable to furnish mechanisms for functional monitoring of a variable cylinder compression setting in a reciprocating-piston internal combustion engine which are particularly easily implementable, accurate, and efficient.

SUMMARY

According to a first aspect of the present invention, a method for functional monitoring of an apparatus for variable setting of a cylinder compression in a reciprocating-piston internal combustion engine is provided, which method includes: ascertaining a value of an engine parameter which is indicative of an engine position of the internal combustion engine at a defined cylinder compression; comparing the ascertained value with a further value of the engine parameter; and determining, depending on a result of the comparison, whether the apparatus for variable setting of the cylinder compression is functioning correctly, i.e., that the apparatus is functioning either correctly or incorrectly.

The method according to the present invention can be based on ascertaining an influence of variable cylinder compression of gas in one or more cylinders of the internal combustion engine on forces of the compressing gas, enclosed in the cylinder or cylinders, on components of the internal combustion engine and thus on an engine position, in order to obtain therefrom a conclusion as to correct, i.e., proper, or incorrect or defective, i.e., improper, functioning of the apparatus for variable setting of cylinder compression. In particular when the drive train of the internal combustion engine is open, and in unfueled coasting mode, elevated return forces in the cylinder of the internal combustion engine at a higher cylinder compression cause greater friction during engine operation and thus a change in the time course of the engine position. The "engine position" can be characterized as a motion position of those components of the internal combustion engine which influence the torque of the internal combustion engine, for example a crankshaft or a transmission input shaft.

By way of the method it is possible, in particularly simple, efficient and accurate fashion, to perform via the force action chain in the internal combustion engine an evaluation of the engine-position-relevant signals in order to identify correct or incorrect operation of the apparatus for variable setting of the cylinder compression. The method according to the present invention is usable in particular without position sensor equipment for a motion of the reciprocating piston of the cylinder or cylinders of the internal combustion engine.

In an embodiment, the further value can be a reference value that is to be expected, in a context of correct functioning of the apparatus, for the engine parameter in the context of the cylinder compression; it is possible to determine that the apparatus is functioning correctly if, in the comparison, a difference between the ascertained value and the reference value is less than a predetermined threshold value. In the event of a contrary result it can be established that the apparatus is not functioning correctly. This can make possible in particularly simple fashion a plausibility check of the functionality of the apparatus, in which a modeled reference value is used.

In an embodiment, the further value can be ascertained in the context of a further, defined, different cylinder compression, a determination being made that the apparatus is functioning correctly if, in the comparison, a difference between the ascertained value and the further value is greater than a predetermined threshold value. In the event of a contrary result it can be established that the apparatus is not functioning correctly. In particular, the value and the further value of the engine parameter can be ascertained at extreme cylinder compressions, for example at a minimum possible cylinder compression and a maximum possible cylinder compression. This measure can enable a direct comparison between different cylinder compressions during engine operation, so that this measure can result in the simplest and most efficient possible functional monitoring without modeling of a reference value.

In particular, in order to ensure active diagnosis of the functional monitoring, the defined cylinder compression and/or the further, different cylinder compression can be set before the value of the engine parameter is ascertained.

In an embodiment, the value and optionally the further value can be ascertained in an engine start phase or an engine stop phase, in which context the internal combustion engine can be operated with an open drive train or in an, in particular unfueled, coasting mode. In an operating mode with an open drive train during the engine start phase or during engine rundown in the engine stop phase, it is possible in particular to use for functional monitoring a cylinder compression that is actually present. In particular, differences in an initial engine position at the beginning of ascertainment can be taken into account, and/or differences in the electrical power inputted via the start, a starter efficiency, a vehicle electrical system voltage, further loads, ambient conditions (temperature, air pressure, etc.) can be compensated for in order to ensure the repeatability and accuracy of the method. In an advantageous configuration of the method, in particular the value and the further value can be used in start/stop internal combustion engines having multiple engine start phases and engine stop phases during a journey, by way of a respectively different setting of the cylinder compression in successive engine start and engine stop phases, and a relative comparison between the values ascertained for the different cylinder compressions.

In an embodiment, the ascertaining step can involve ascertaining values of the engine parameter in time-dependent fashion, in particular proceeding from a defined initial engine position and initial engine rotation speed to a target engine rotation speed. This enables particularly accurate functional monitoring of the apparatus, since a comparison can be made between multiple values of the value of the engine parameter and of the further value.

In an embodiment, a characteristic feature for the comparison can be ascertained from the ascertained values and optionally from the further values, which feature encompasses, for example, a time duration until a desired engine rotation speed is reached; or a desired rotation speed difference proceeding from an initial engine rotation speed; a maximum, minimum, or average segment time; a ratio between a maximum and a minimum of the ascertained value; or an integral derivation of the time course of the values with respect to the reference values. A "segment" here can be a defined angular rotation of the crankshaft or of the transmission input shaft, for example a quarter-revolution of the corresponding shaft. The segment time can correspond to a time duration that can be associated with the segment, i.e., with the angular rotation. In particular, in the comparison the characteristic feature can be compared with a corresponding feature that can be ascertained by way of the further values. This measure can enhance the accuracy of the method, since the expected course of the engine position can be analyzed in targeted fashion.

In an embodiment, the engine position can be characterized by a crankshaft position of a crankshaft and/or by a position of a transmission input shaft that is disposed in particular upstream from a clutch. A crankshaft position can be ascertained, for example, by way of a position sensor that is mounted on the crankshaft and serves to ascertain the crankshaft position, for example in the form of a location and/or a rotation angle, and/or via an encoder wheel that is mounted on the crankshaft and is coupled to an angle sensor for the crankshaft position. Inter-tooth times of the angle sensor correspond here to an indication of angular increments in the time duration of a rotation of the crankshaft. It is possible for a shared sensor for directly ascertaining the crankshaft position and the angular rotation of the encoder wheel to be used. The crankshaft position can be ascertained in particular in the context of an operating mode with an open drive train. A transmission input shaft position of the transmission input shaft can be ascertained by way of a position sensor for ascertaining a rotation speed encoder wheel position, in particular a rotation angle, of a rotation speed encoder wheel for the transmission input shaft. The rotation speed encoder can be disposed on the transmission input shaft. The position of the transmission input shaft can be ascertained in particular in the context of an operating mode with a closed drive train. This measure can enable particularly simple functional monitoring of the apparatus, since the motion of the components on which the compressed gas acts can be considered.

Before the value of the engine parameter is ascertained, a determination can be made in particular as to whether input conditions for execution of the method, for example ambient conditions (for example, ambient temperature, ambient pressure, elevation, etc.), a driver input (for example in the form of an engine rotation speed), an operating strategy for the internal combustion engine and/or operating conditions of the internal combustion engine (for example, a minimum intake duct pressure, a coolant temperature above a threshold value, an initial engine position, operational readiness of the apparatus, a vehicle speed, a vehicle electrical system voltage, an engine temperature, an engine rotation speed) are met in order to authorize functional monitoring. It is thereby possible for functional monitoring to proceed during defined input conditions.

For example, it is possible to ascertain for various cylinder compressions a time duration of a fixed number of crankshaft revolutions proceeding from the same engine position and engine rotation speed. This time duration can be expected to be longer for a high cylinder compression because of elevated friction during the engine start phase, and can also expected to be longer in an engine stop phase than in a context of low cylinder compression. Additionally or alternatively, the time course of the engine position can be compared with the expected reference time course. Additionally or alternatively a maximum inter-tooth time that, with maximum compression, is located close to a top dead center point in the working cycle of the cylinder, can be considered, this being expected to be longer at a high cylinder compression due to counter-forces of the high gas pressure. Additionally or alternatively, a time course of the engine position can be evaluated in a coasting mode during an engine start phase, in which the internal combustion engine is being revved up to an engine rotation speed. An increased time duration until the desired engine rotation speed is reached can be expected in this operating phase due to higher cylinder compression. Additionally or alternatively, a time phase in which the intake duct pressure is greater than a minimum intake duct pressure in an intake duct of the internal combustion engine can be evaluated in the context of the functional monitoring in the engine stop phase, in order to minimize perceptibility of the functional monitoring for a driver of a vehicle that has the internal combustion engine. This can occur in particular during engine-off coasting operation at vehicle speeds greater than zero. Additionally or alternatively, if the existence of a specific fault in correct operation of the apparatus is suspected, a specifically modified operating mode of the internal combustion engine can be used, for example characterized by a longer-duration engine start phase or engine stop phase and a modified position of a throttle valve or camshafts that are connected to the crankshaft. As a result of the extended duration of the engine start phase or opening of the throttle valve in the extended engine stop phase, the robustness of the method can be increased to the extent that the effects of cylinder compression and thus the possibility of robust functional monitoring under those operating conditions can exist to a greater degree.

In accordance with a second aspect, a functional monitoring apparatus for functional monitoring of an apparatus for variable setting of a cylinder compression in a reciprocating-piston internal combustion engine is furnished, which is configured to execute steps of a method in accordance with the first aspect.

Optionally, the ascertained value or values and/or the further value or values can be stored in that context. The functional monitoring apparatus can be a component of an electronic control device for controlling an internal combustion engine. The functional monitoring apparatus can be embodied by way of hardware and/or software, and/or it can have one or more units that are configured to carry out one or more of the method steps of the method and/or that have, for example, corresponding members, in particular electronic components such as circuits, capacitors, transistors, or the like.

In accordance with a third aspect, a computer program that is configured to carry out steps of a method in accordance with the first aspect is furnished. The computer program can be executed for that purpose, for example, by the functional monitoring apparatus. The functional monitoring apparatus can have for that purpose, for example, a conventional processor usable for general purposes, on which the computer program can execute. The computer program can be, for example, part of a computer program that can carry out one or more other functional monitoring diagnoses for the apparatus, as is described, e.g., in German Patent Application No. DE 199 55 250 A1.

In accordance with a fourth aspect an electronic storage medium, on which a computer program in accordance with the third aspect can be stored, is furnished. The electronic storage medium can be embodied, for example, as an external memory, as an internal memory, as a hard drive, or as a USB memory device.

BRIEF DESCRIPTION OF THE DRAWINGS

Preferred embodiments of the present invention are explained in further detail below with reference to the figures.

DETAILED DESCRIPTION OF EXAMPLE EMBODIMENTS

Figure 1:
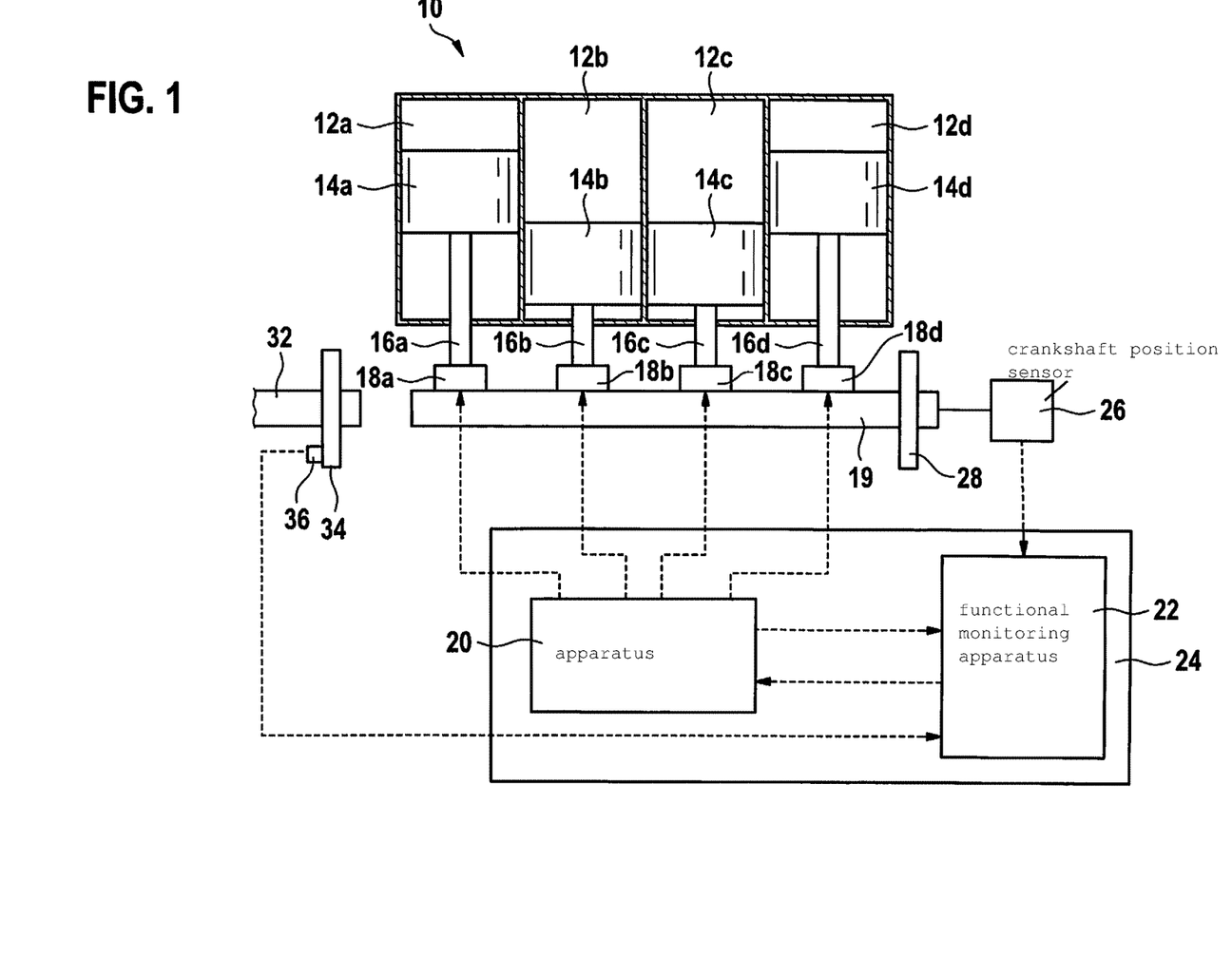
FIG. 1 schematically depicts an internal combustion engine having an apparatus for variable setting of a cylinder compression.

Internal combustion engine 10 shown in FIG. 1 has four cylinders 12a to 12d whose internal volume can be enlarged and reduced by way of a respective piston 14a to 14d. Each of pistons 14a to 14d is movable with a different connecting rod 16a to 16d, to which control can be applied by way of a different compression setting member 18a to 18d and which are connected to a crankshaft 19 of internal combustion engine 10. Setting members 18a to 18d can have control applied to them individually by way of a shared apparatus 20 for variable setting of a cylinder compression in cylinders 12a to 12d, the correct operation of which can be monitored by a functional monitoring apparatus 22. Apparatus 20 and functional monitoring apparatus 22 are part of an electronic control device 24 for controlling internal combustion engine 10. The cylinder compression is settable in individual-cylinder fashion using conventional techniques, as described for example in DE 197 03 948 C1, by modifying a length of connecting rod 16a to 16d.

A crankshaft position sensor 26 for time-dependent detection of a crankshaft position, and a crankshaft position encoder wheel 28, are disposed on crankshaft 19. Crankshaft position sensor 26 is furthermore configured to detect in time-dependent fashion an angular motion of encoder wheel 28 and thus an inter-tooth time of the crankshaft angular position. The crankshaft position and the crankshaft angle indicate an engine position of internal combustion engine 10, and sensor 26 outputs corresponding position signals to functional monitoring apparatus 22. A transmission input shaft 32 upstream from a clutch is coupled to crankshaft 19. A rotation speed encoder wheel 34 is disposed on transmission input shaft 32; disposed on said encoder wheel is a transmission input shaft position sensor 36 that is configured to detect in time-dependent fashion, as a position detection, an angular motion of encoder wheel 34 and thus an inter-tooth time. The transmission input shaft position indicates the engine position of internal combustion engine 10, and sensor 36 outputs corresponding position signals to functional monitoring apparatus 22. Detection of the engine position can be carried out using both sensors 26, 36. It is also possible for only crankshaft position sensor 26 or transmission input shaft sensor 36 to be present. It is assumed hereinafter that only crankshaft position sensor 26 is used to detect the engine position.

Figure 2:
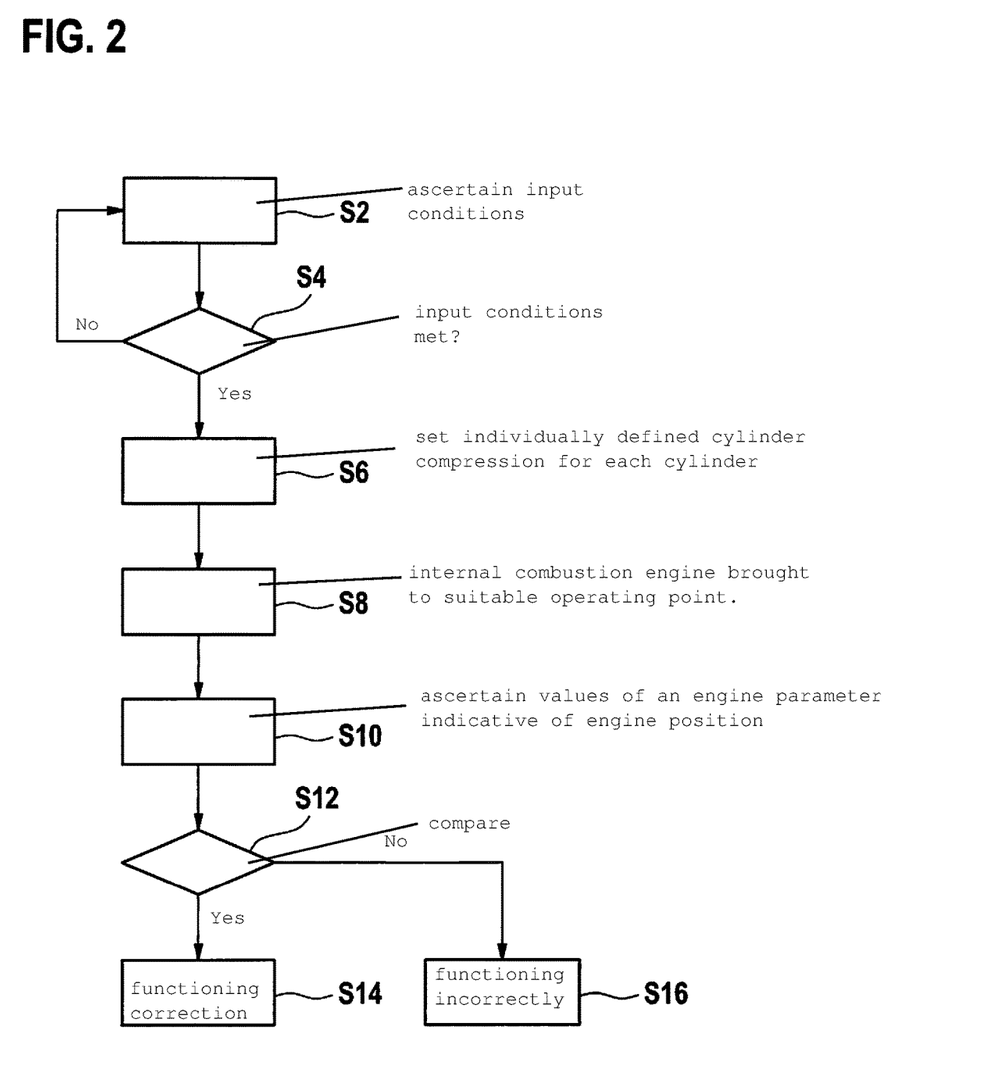
FIG. 2 is a flow chart of a method for functional monitoring of the apparatus for variable setting of a cylinder compression.

In an operating mode of internal combustion engine 10, a method for functional monitoring of apparatus 20 for variable setting of the cylinder compression in internal combustion engine 10 is carried out by way of functional monitoring apparatus 22. In an optional first method step S2, the input conditions currently present for the method are ascertained. These input conditions can encompass, for example, a driver input, an operating strategy for internal combustion engine 10, operating parameters of internal combustion engine 10, or ambient conditions. A further method step S4 ascertains whether the input conditions necessary for functional monitoring are met. If not, method step S2 is performed again. If the input conditions are met, then in a further optional method step S6 a defined cylinder compression for each of cylinders 12a to 12d is set individually for the functional monitoring of apparatus 20 which is to be carried out. In a method step S8 subsequent thereto, internal combustion engine 10 is brought to the operating point suitable for functional monitoring, which point can correspond, for example, to an engine start phase or engine stop phase with an open drive train, or coasting mode.

In a further method step S10, values of an engine parameter that is indicative of the engine position of internal combustion engine 10 are ascertained as a function of time in the context of the defined cylinder compression in cylinders 12a to 12d. For this purpose, for example, functional monitoring apparatus 20 can receive measured values of sensor 26 which are ascertained at regular time intervals. Time-dependent measurement can be accomplished starting at a defined initial engine position and an initial engine rotation speed. In addition, a characteristic feature, for example a time duration until a predetermined number of crankshaft revolutions have been carried out, can be ascertained from the ascertained values. External influences that can occur during measurement of the engine position values, for example an air pressure, an outside temperature, a vehicle electrical system voltage for a starter of internal combustion engine 10, an efficiency of the starter, further loads, etc., can additionally be compensated for in method step 10 in such a way that the ascertained engine position values exhibit no deviation that is brought about by those influences. Alternatively, the values can first be measured with sensor 26 and then compensated for computationally.

In a further method step S12, the values ascertained in method step S10 are compared with further values of the engine parameter, by calculating a difference between the values ascertained in step S10 and the further values and comparing that difference with a threshold value. Depending on the result of the comparison, it is possible to determine in a method step S14 subsequent thereto that apparatus 20 for variable setting of the cylinder compression is functioning correctly, or to determine in a method step S16 that apparatus 20 for variable setting of the cylinder compression is functioning incorrectly.

In a configuration of the method, in method step S12 the time-related course of the values of the engine parameter can be compared with a modeled reference course that is to be expected in a context of correct functioning of apparatus 20 for the engine parameter for the defined cylinder compression. If the difference between the ascertained values and the reference values is greater than a predetermined threshold value, then in step S16 incorrect functioning of apparatus 20 is recognized; whereas with a difference that is less than or equal to the threshold value, fault-free functioning of the apparatus is recognized in method step S14. In a further configuration, the values ascertained in step S10 are compared in method step S12 with further values ascertained by way of sensor 26, analogously to method step S10, in the context of a different defined cylinder compression, and a difference between these two time courses is calculated. If the difference is less than a predetermined threshold value, then defective functioning of apparatus 20 is recognized in step S16, whereas with a difference greater than or equal to the threshold value, fault-free functioning of the apparatus is recognized in method step S14. It is also possible for corresponding characteristic features that have been ascertained from the ascertained values or the further values to be compared with each other in this method step using a suitable query criterion.

Figure 3:
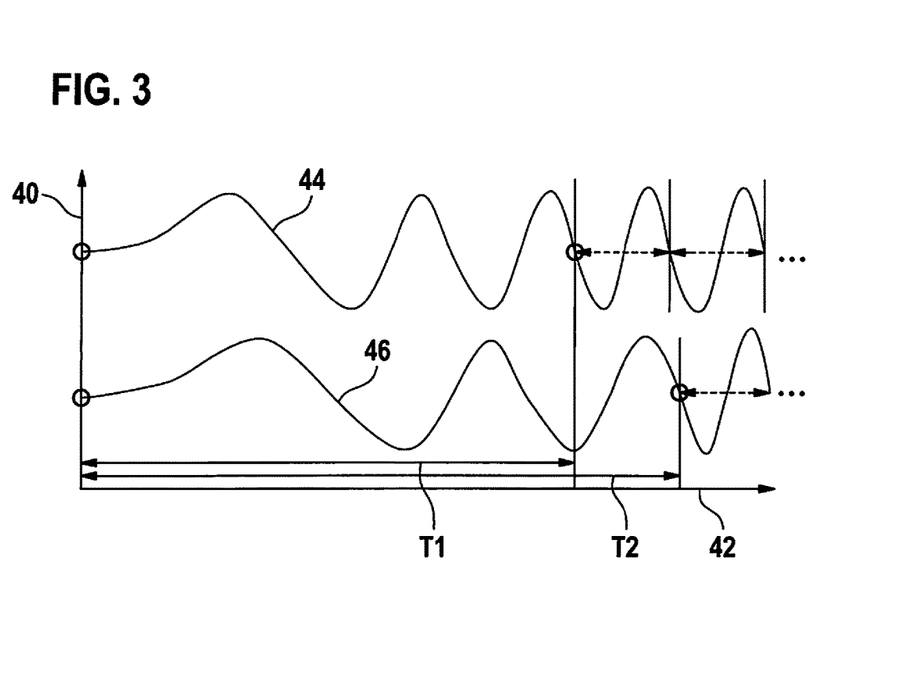
FIG. 3 is a schematic diagram showing a time-dependent engine position in an engine start phase.

FIG. 3 shows values ascertained with sensor 26 for an engine position 40 as a function of time 42, for a case in which cylinder compression is low (curve 44) and for a case in which cylinder compression is high (curve 46). The values were ascertained in an engine start phase. Similar values can be ascertained for an engine restart during operation of internal combustion engine 10. It is evident that the time T1 (labeled with a double arrow) for n crankshaft revolutions until a target engine rotation speed is reached is shorter for the case of low cylinder compression than a corresponding time T2 for the case of high cylinder compression. Once the target engine rotation speed is reached, a time (labeled with a dashed double arrow) for one crankshaft revolution is constant. Be it noted that in the example shown, differences in a net voltage which are caused by the starter or by additional electrical losses are compensated for. In addition, care was taken in the context of measurement that the initial engine position was within a specified region that had been taken into consideration when internal combustion engine 10 was previously shut off.

Figure 4:
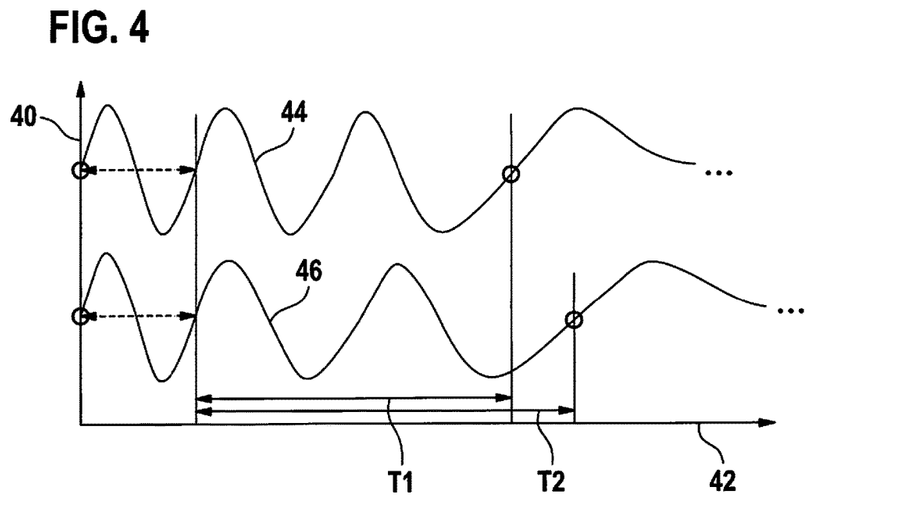
FIG. 4 is a schematic diagram showing a time-dependent engine position in an engine stop phase.

FIG. 4 shows curves for values of an engine position 40 as a function of time 42 in an engine stop phase, for the case in which cylinder compression is low (curve 44) and high (curve 46). An initial time within which one crankshaft revolution occurs is labeled with a dashed double arrow, and is constant for both cases. The ascertained time T1 (labeled with a double arrow) for n crankshaft revolutions, proceeding from a defined initial engine position and engine rotation speed, until a target engine rotation speed is reached is shorter for the case of low cylinder compression than a corresponding time T2 for the case of high cylinder compression. In the ascertainment process care was taken that differences in the values which were caused by a manner of operation of connecting rods 16a to 16d during the engine stop phase were identical or had been suitably compensated for.

Figure 5:
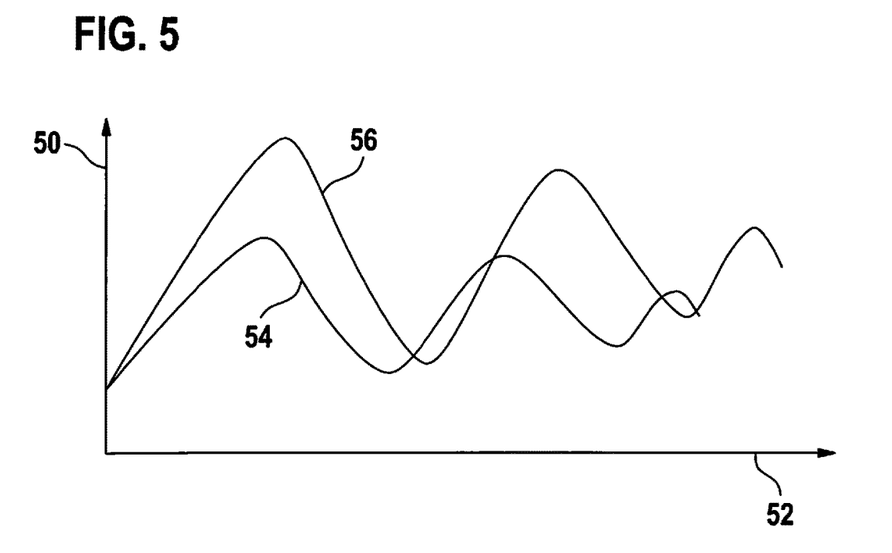
FIG. 5 is a schematic diagram showing a time-dependent inter-tooth time in an engine start phase.

FIG. 5 shows inter-tooth times 50 that are measured in an engine start phase by crankshaft position sensor 26 as a function of a time 52. In the case of low cylinder compression (curve 54) short inter-tooth times are achieved, while in the case of high cylinder compression longer inter-tooth times (curve 56) compared therewith are achieved. Be it noted that the values shown are absolute ones for which combustion has not yet begun; in other words, no combustion has yet taken place. In addition, differences in period lengths between low and high cylinder compression can be compensated for. The inter-tooth times decrease over time when combustion engine 10 is accelerating.

Figure 6:
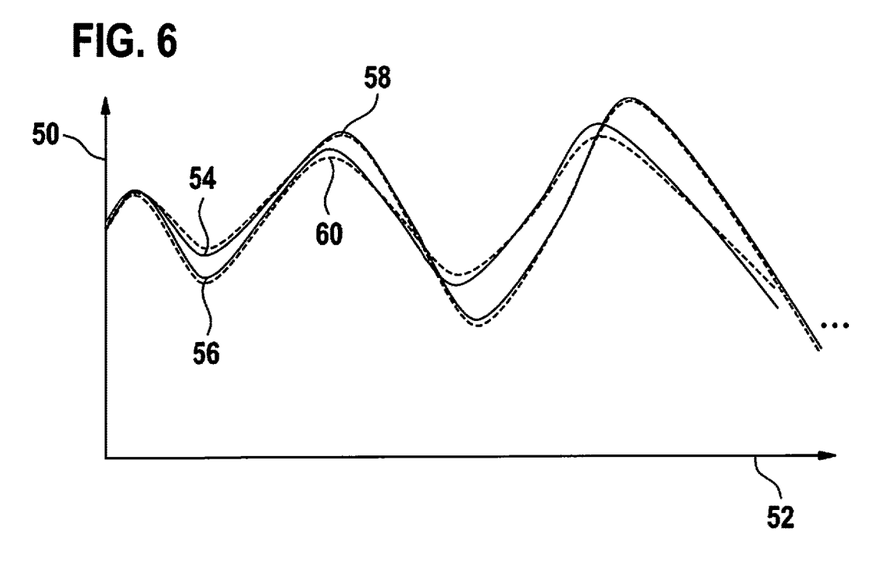
FIG. 6 is a schematic diagram showing a time-dependent inter-tooth time in an engine stop phase.

FIG. 6 shows inter-tooth times 50 that are ascertained by crankshaft position sensor 26 as a function of a time 52 in an engine stop phase, for the case in which cylinder compression is low (curve 54) and cylinder compression is high (curve 56). Corresponding expected reference curves 58, 60 for the respective curves 54, 56, which are used in the comparison to be carried out, are additionally shown. FIG. 6 shows absolute values for the inter-tooth times. The differences in period length between low and high cylinder compression can be compensated for, and the inter-tooth times increase over time when combustion engine 10 is decelerating.

What is claimed is:

1. A method for functional monitoring of an apparatus for variable setting of a cylinder compression in a reciprocating-piston internal combustion engine, comprising:
   detecting, using a crankshaft position sensor and a crankshaft position encoder wheel situated on a crankshaft of the internal combustion engine, first positions of the crankshaft over time at a first defined cylinder compression;
   comparing, by a computer processor of a functional monitoring apparatus, a course of the detected first positions of the crankshaft over time to (i) a modeled course of crankshaft positions over time for the defined cylinder compression, or (ii) a course detected second positions of the crankshaft over time at a second defined cylinder compression, different than the first defined cylinder compression, the detected second position being detected using the crankshaft position sensor and the crankshaft position encoder; and
   determining, depending on a result of the comparison, by the computer processor, whether the apparatus for variable setting of the cylinder compression is functioning correctly.

2. The method as recited in claim 1, wherein in the detecting step, the first positions of the crankshaft over time are detected in an engine start phase or an engine stop phase, the internal combustion engine being operated in that context with an open drive train or in a coasting mode.

3. The method as recited in claim 1, wherein in the comparing step, the course of the detected first positions of the crankshaft over time is compared to the modeled course of crankshaft positions over time for the defined cylinder compression, and wherein in the determining step: (i) a determination is made that the apparatus is functioning correctly when a difference between the course of the detected first positions of the crankshaft over time and the modeled course of crankshaft positions over time for the defined cylinder compression is less than or equal to a predetermined threshold value, or (ii) a determination is made that the apparatus is incorrectly when the difference between the course of the detected first positions of the crankshaft over time and the modeled course of crankshaft positions over time for the defined cylinder compression is greater than a predetermined threshold value.

4. The method as recited in claim 1, wherein in the comparing step, the course of the detected first positions of the crankshaft over time is compared to the course of the detected second positions of the crankshaft over time at the second defined cylinder compression, and wherein in the determining step: (i) a determination is made that the apparatus is functioning incorrectly when a difference between the course of the detected first positions of the crankshaft over time and the course of the detected second positions of the crankshaft over time at the second defined cylinder compression is less than or equal to a predetermined threshold value, or (ii) a determination is made that the apparatus is correctly when the difference between the course of the detected first positions of the crankshaft over time and the course of the detected second positions of the crankshaft over time at the second defined cylinder compression is greater than or equal to a predetermined threshold value.

5. A method for functional monitoring of an apparatus for variable setting of a cylinder compression in a reciprocating-piston internal combustion engine, comprising:
  detecting, using a crankshaft position sensor and a crankshaft position encoder wheel situated on a crankshaft of the internal combustion engine, first positions of the crankshaft over time at a first defined cylinder compression;
  determining, by a computer processor of a functional monitoring apparatus, a first time duration of a predetermined number of crankshaft revolutions based on the first determined positions;
  detecting, using the crankshaft position sensor and the crankshaft position encoder wheel situated on a crankshaft of the internal combustion engine, second positions of the crankshaft over time at a second defined cylinder compression different than the first define cylinder compression;
  determining, by the computer processor, a second time duration of the predetermined number of crankshaft revolutions based on the second determined positions;
  comparing, by the computer processor, the first time duration and the second time duration; and
  determining, depending on a result of the comparison, by the computer processor, whether the apparatus for variable setting of the cylinder compression is functioning correctly.

6. A functional monitoring apparatus for functional monitoring of an apparatus for variable setting of a cylinder compression in a reciprocating-piston internal combustion engine, wherein the apparatus is configured to:
  detect, using a crankshaft position sensor and a crankshaft position encoder wheel situated on a crankshaft of the internal combustion engine, first positions of the crankshaft over time at a first defined cylinder compression;
  compare, by a computer processor of the apparatus, a course of the detected first positions of the crankshaft over time to (i) a modeled course of crankshaft positions over time for the defined cylinder compression, or (ii) a course detected second positions of the crankshaft over time at a second defined cylinder compression, different than the first defined cylinder compression, the detected second position being detected using the crankshaft position sensor and the crankshaft position encoder; and
  determine, depending on a result of the comparison, by the computer processor, whether the apparatus for variable setting of the cylinder compression is functioning correctly.

7. The functional monitoring apparatus as recited in claim 6, wherein in the comparing, the course of the detected first positions of the crankshaft over time is compared to the modeled course of crankshaft positions over time for the defined cylinder compression, and wherein in the determination: (i) a determination is made that the apparatus is functioning correctly when a difference between the course of the detected first positions of the crankshaft over time and the modeled course of crankshaft positions over time for the defined cylinder compression is less than or equal to a predetermined threshold value, or (ii) a determination is made that the apparatus is incorrectly when the difference between the course of the detected first positions of the crankshaft over time and the modeled course of crankshaft positions over time for the defined cylinder compression is greater than a predetermined threshold value.

8. The functional monitoring apparatus as recited in claim 6, wherein in the comparing, the course of the detected first positions of the crankshaft over time is compared to the course of the detected second positions of the crankshaft over time at the second defined cylinder compression by the apparatus, and wherein in the determination: (i) a determination is made by the computer processor that the apparatus is functioning incorrectly when a difference between the course of the detected first positions of the crankshaft over time and the course of the detected second positions of the crankshaft over time at the second defined cylinder compression is less than or equal to a predetermined threshold value, or (ii) a determination is made by the computer processor that the apparatus is correctly when the difference between the course of the detected first positions of the crankshaft over time and the course of the detected second positions of the crankshaft over time at the second defined cylinder compression is greater than or equal to a predetermined threshold value.

\* \* \* \* \*